Patented Feb. 26, 1929.

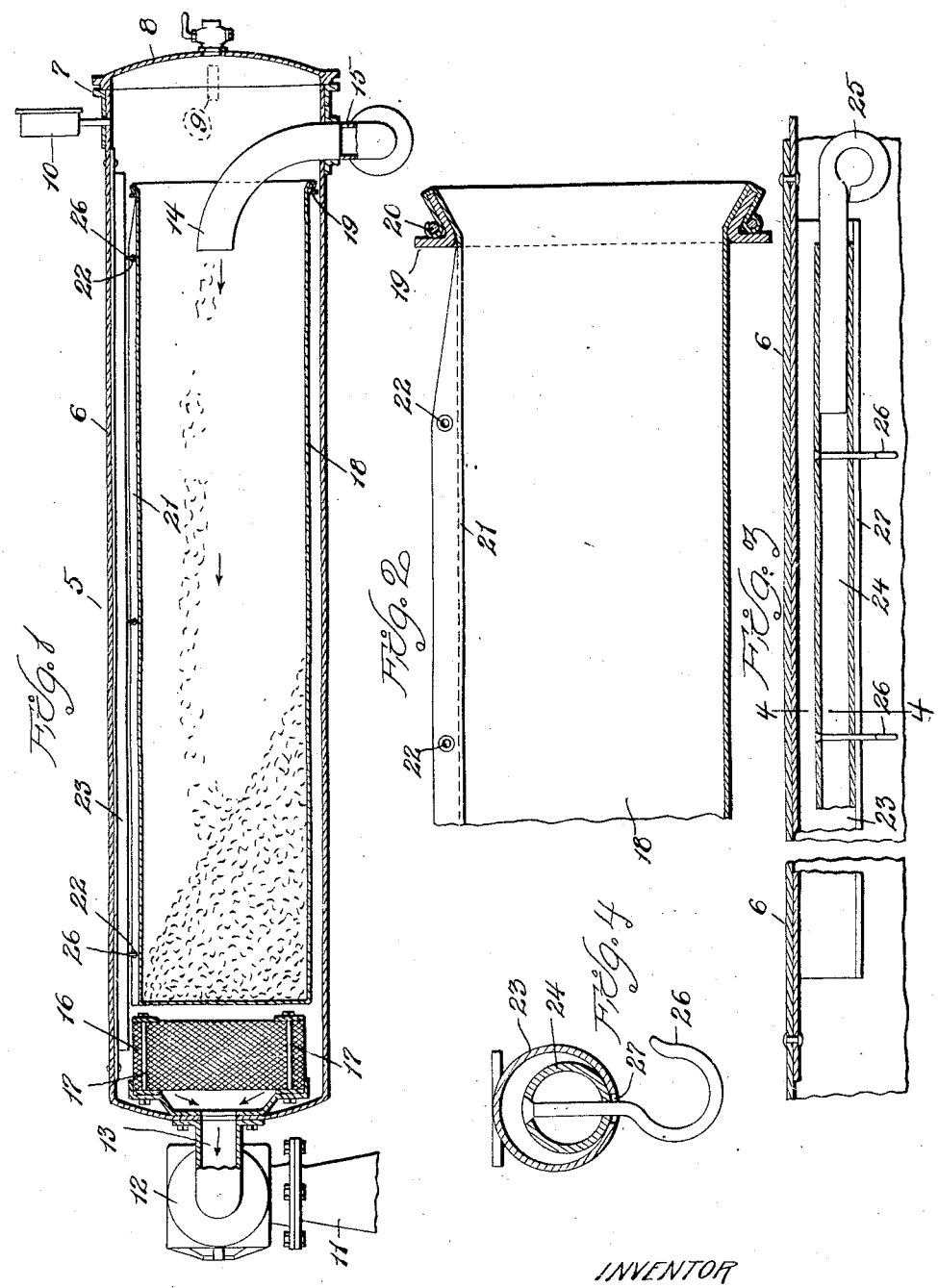

1,703,503

UNITED STATES PATENT OFFICE.

JOHN S. THURMAN, OF ST. LOUIS, MISSOURI.

TANK AND SACK FOR HARVESTING MACHINES.

Original application filed September 13, 1923, Serial No. 662,528. Divided and this application filed December 7, 1925. Serial No. 73,957.

This is a divisional application divided out of applicant's patent application for a harvester and gin, filed Sept. 13, 1923, Serial Number 662,528.

This invention relates to combination harvesting and ginning machines. By the use of my machine cotton is picked by a mere presentation of nozzles to bolls and ginned in its progress through the machine, the lint being delivered to a bag or bags and the seed to a proper container. The entire machine is detachably secured to a tractor or other vehicle or engine, so that it may be secured or detached by the application or removal of a few bolts, whereby the entire device may be readily moved over the entire field to be harvested and ginned and whereby when the picking and ginning is completed, the vehicle may be free for other work.

This invention relates more specifically to a vacuum cotton harvester and gin, the vacuum being produced by a positive acting rotary pump.

Among the objects of my device are included the fabrication of a machine having a plurality of hoses and nozzles for picking and a plurality of vacuum tanks, removable, collapsible cotton containers being detachably secured in the tanks in sliding engagement. A further object is to provide each of the tanks with a dust screen by which air is thoroughly screened of all dust and trash entering the vacuum pump. The bags are provided with a seam in which are formed eyes which may be positioned on hooks formed on a pipe, which in turn is positioned in sliding engagement in a second pipe positioned at the inner top of the container. By this means the bags may be easily inserted and removed. Furthermore the bags are made sufficiently porous to permit any fine dirt that may be associated with the cotton to sift through to the vacuum tanks from which it may be easily removed. Simple methods of securing the open ends of the bags in the vacuum tanks are provided so that the bags may be quickly attached. Means for deflecting the cotton lengthwise in the sacks are also included.

With these and other objects in view my invention has relation to certain novel features of construction and arrangement of parts as will be hereinafter more fully described, pointed out in the claims, and illustrated in the drawings, in which, Fig. 1 is a longitudinal, sectional elevation of one of my tanks and bags, together with its connection with the suction conduit.

Fig. 2 is an enlarged, fragmental, longitudinal, sectional elevation of one of my sacks, together with its retaining ring.

Fig. 3 is a fragmental, longitudinal, sectional elevation of a sack rod and guide.

Fig. 4 is a transverse, sectional elevation on the line 4—4 of Fig. 3.

Numeral 5 designates one of a plurality of vacuum tanks consisting of the shell, such as 6 open at the front end and having flanges 7, and the door, such as 8 hingedly secured to the flange with the flat spring door catch 9 attached to hold the door closed. A rubber gasket is inserted in the flange to seal the door. In the doors are formed glazed openings in order to make the interior of the tanks visible. A vacuum pressure gage such as 10 is placed on the shell 6 in a convenient position. By the means of the pipe 11 and the valve 12, and the pipe 13, the tank 5 is placed in fluid communication with a vacuum pump (not shown).

The entry of the cotton to the tank 5 is made through the curved spout 14 which is inserted into the pipe 15 which passes through the shell 6, as shown in Fig. 1. A metallic dirt screen box 16 held together by the bolts 17 is secured in the rear end of the tank 5. A porous cloth is tied over the screen box 16 in order to further screen the dirt and prevent it passing from the tanks to the pump. The cotton upon entering the tanks is deposited in cloth sacks 18 of the length but smaller in diameter than the tanks. The air is permitted to circulate between the sack and tank, as best shown in Figs. 1 and 2.

The spout 14 has its free end in a horizontal plane so that the cotton is shot longitudinally into the sacks. The cloth sack 18 is open at one end. In order to maintain the receiving end of the sack 18 at an open and not in a collapsible position, the ring 19 is employed. The end of the sack 18 is stretched over the ring 19, leaving the sack end open. The sacks are then tied to the ring by means of the cord 20. In order to hold the sacks in the tank in an open position, the following instrumentalities are employed. A longitudinal seam such as 21 is formed on each sack, having eyes 22 formed therein at regular intervals. A pipe 23, having a longitudinal slot formed therein is positioned at the top of the inside of the vacuum tank and secured to the front and rear thereof. A pipe 24, having a handle 25 and hooks 26 secured thereto at various points is placed in sliding engagement in the pipe 23 so that the hooks 26 will slide through the slots 27. The hooks 26 are spaced apart the same distance as are the eyes 22. The bags may, therefore, be suspended in the tanks by hanging them on the hooks 26 by means of their eyes 22. To insert or remove a bag in or out of its tank, the curved spout 14 is removed and the pipe 24 simply slid in or out of the pipe 23.

What I claim and mean to secure by Letters Patent is,

1. An elongated container positioned with its longitudinal axis in a horizontal plane and containing a sack which is so suspended therein as to retain its extended position, and with its opening at one end to receive the cotton.

2. In a cotton harvester, an elongated sealed container having a detachable cover at one end and a suction connection at the other, a fixed member disposed longitudinally within said tank adjacent to the wall thereof, a sack open at one end for receiving the cotton, means engageable with said member for detachably supporting said sack within said container in spaced relation therewith so as to form an annular air space between said sack and said container, a cotton delivering hose centering said container near the open end of said sack, and a discharge spout in said container and connected to said hose, said spout having its discharge end presented longitudinally of said sack toward the open end thereof for discharging the cotton toward the closed end of said sack.

3. In a cotton harvester, an elongated sealed container arranged in a horizontal plane and having a detachble cover at one end and a suction connection at the other, a member fixed longitudinally within said container adjacent to the wall thereof, a sack having one end open for receiving cotton, means for slidably engaging said member and detachably supporting said sack in said container in spaced relation therewith to provide an annular air space between said sack and said container, and a cotton delivering spout extending into said tank and having its discharge end presented within the open end of said sack for discharging cotton longitudinally into said sack.

4. In a cotton harvester, an elongated container arranged in a horizontal plane having an open end adapted to be hermetically closed, a suction connection leading from the opposite end of said container, a sack of sieve material, said sack being of smaller dimensions than the inside dimensions of said container, means for detachably supporting said sack throughout its entire length in a horizontal plane within said container in spaced relation therewith, and a cotton delivering spout disposed within said container with its discharge mouth presented toward the open end of said sack and having exterior connections for delivering cotton into said sack.

5. In a cotton harvester, an elongated container arranged in a horizontal plane and having an open end, a cover for hermetically closing said end, a suction connection leading from the other end to produce vacuum in said container, a sack of sieve material adapted to be placed within said container, said sack having an open end, a rigid ring detachably secured to said open end for holding the latter in open position, means for removably supporting said sack within said container in a horizontal plane in spaced relation with the inner walls thereof, a cotton delivery spout removably disposed within said container and having its discharge end presented toward the open end of said sack, a cotton delivering hose connection located exterior of said container and communicating with said spout.

6. In a cotton harvester, an elongated sealed container arranged in a horizontal plane and having a detachable cover at one end and a suction connection at the other, a member fixed longitudinally within said container adjacent to the wall thereof, a sack having one end open for receiving cotton, means for slidably engaging said member and detachably supporting said sack within said container in spaced relation therewith to provide an annular air space between said sack and said container, a cotton delivering spout extending into said tank and having its discharge end presented within the open end of said sack for discharging cotton longitudinally into said sack, and a screen arranged within said container and enclosing the mouth of said suction connection.

7. In a cotton harvesting machine, an elongated container having a detachable cover at one end and a suction opening at the other, said container being adapted to be hermetically sealed, a fixed member disposed longitudinally within said container adjacent to the wall thereof, a sack open at one end for receiving cotton, means removably supported by said member for detachably positioning said sack within said container in spaced-apart relation therewith so as to form air space between said sack and said container, a spout removably arranged within said container and having its discharge end terminating within the open end of said sack for delivering cotton thereinto in a longitudinal direction, said spout being adapted to be connected to a cotton picking hose connection located exteriorly of said tank, and a suction pipe connected to the suction opening of said container for exhausting the air therefrom.

8. In an apparatus of the class described, an elongated container disposed in a horizontal plane, said container having a suction connection at one end and a detachable cover at the other end, said container being adapted to be hermetically sealed and placed under vacuum, a sack of reticulated material open at one end, means for detachably supporting said sack throughout its entire length within said container substantially coaxially therewith, said sack being of smaller dimensions than the interior of said container so as to provide air space therebetween, and a rigid spout removably disposed within said container and having its discharge end presented toward the open end of said sack, said spout having its opposite end opening exteriorly of said container and adapted to be connected to a hose connection of a cotton picking nozzle.

9. In an apparatus of the class described, an elongated container disposed in a horizontal plane, said container having a suction connection at one end and a detachable cover at the other end, said container being adapted to be hermetically sealed and placed under vacuum, a sack of reticulated material open at one end, a rigid ring detachably secured to said sack for holding said open end in extended position, means for detachably supporting said sack throughout its entire length within said container substantially coaxially therewith, said sack being of smaller dimensions than the interior of said container so as to provide an air space therebetween, and a rigid spout removably disposed within said container and having its discharge end presented toward the open end of said sack, said spout having its opposite end opening exteriorly of said container and adapted to be connected to a hose connection of a cotton picking nozzle.

10. In an apparatus of the class described, the combination with a horizontally disposed container adapted to be hermetically sealed and placed under vacuum, of a sack adapted to be removably supported in said container in a horizontal plane substantially coaxially with the same, for receiving cotton discharged into said sack through the open end thereof, and a cotton delivering spout within said container and having its discharge end presented toward the open end of said sack and having its opposite end communicating with the exterior of said container and adapted to be connected to a hose of a cotton gathering nozzle.

11. In an apparatus of the class described, the combination with a horizontally disposed elongated container adapted to be hermetically sealed and placed under vacuum, of a suction connection communicating with one end thereof, a sack adapted to be removably supported in said container in a horizontal plane substantially coaxially therewith and in spaced relation with the interior thereof so as to provide an air space therebetween, a rigid ring detachably secured to the open end of said sack for holding said end in open position, and a connection extending exteriorly of said container and communicating with the atmosphere and having the discharge end disposed within said container adjacent to the open end of said sack for delivering cotton into the latter.

In testimony whereof I affix my signature.

JOHN S. THURMAN.